United States Patent
Joo et al.

(10) Patent No.: US 11,645,728 B2
(45) Date of Patent: May 9, 2023

(54) METHOD AND APPARATUS FOR CONTROL ENERGY MANAGEMENT SYSTEM BASED ON REINFORCEMENT LEARNING

(71) Applicants: MakinaRocks Co., Ltd., Seoul (KR); Hanon Systems, Daejeon (KR)

(72) Inventors: Sungho Joo, Seoul (KR); Je Yeol Lee, Seoul (KR); Kyeong Min Woo, Seoul (KR); Minjoo Lee, Seoul (KR); Jeonghoon Lee, Sejong-si (KR); Joongjae Kim, Daejeon (KR); Wonshick Ko, Daejeon (KR)

(73) Assignees: MakinaRocks Co., Ltd., Seoul (KR); Hanon Systems, Daejeon (KR)

( * ) Notice: Subject to any disclaimer, the term of this patent is extended or adjusted under 35 U.S.C. 154(b) by 0 days.

(21) Appl. No.: 17/513,757

(22) Filed: Oct. 28, 2021

(65) Prior Publication Data
US 2022/0138874 A1    May 5, 2022

(30) Foreign Application Priority Data

Oct. 29, 2020  (KR) .................. 10-2020-0142112
Mar. 25, 2021  (KR) .................. 10-2021-0038648

(51) Int. Cl.
*G05B 13/02*   (2006.01)
*G06Q 50/06*   (2012.01)
*G06F 11/30*   (2006.01)

(52) U.S. Cl.
CPC ........... *G06Q 50/06* (2013.01); *G05B 13/027* (2013.01); *G06F 11/3058* (2013.01)

(58) Field of Classification Search
CPC .... G05B 13/027; G06F 11/3058; G06Q 50/06
See application file for complete search history.

(56) References Cited

U.S. PATENT DOCUMENTS

| | | | |
|---|---|---|---|
| 2019/0360711 A1 | 11/2019 | Sohn et al. | |
| 2020/0167611 A1 | 5/2020 | Yoon et al. | |
| 2021/0095898 A1* | 4/2021 | Tarbell | F25B 49/02 |

FOREIGN PATENT DOCUMENTS

| | | |
|---|---|---|
| KR | 10-2019-0140810 A | 12/2019 |
| KR | 10-2020-0062887 A | 6/2020 |
| KR | 10-2131414 B1 | 7/2020 |
| KR | 10-2133737 B1 | 7/2020 |

OTHER PUBLICATIONS

Yu et al. "Multi-Agent Deep Reinforcement Learning for HVAC Control in Commercial Buildings" from "IEEE Transactions on Smart Grid, vol. XX, No. XX, Month 2020" published on Jul. 22, 2020 (Year: 2020).*
Haamoja et al. "Soft Actor-Critic:, Off-Policy Maximum Entropy Deep Reinforcement Learning with a Stochastic Actor" arXiv:1801.01290 [cs.LG], Aug. 8, 2018, 14 pages.

* cited by examiner

*Primary Examiner* — Yuhui R Pan
(74) *Attorney, Agent, or Firm* — Seed IP Law Group LLP

(57) ABSTRACT

Disclosed is a method for controlling an energy management system that is performed by a computing device including at least one processor. The method may include acquiring a target temperature of one or more target points; and controlling one or more control variables using a reinforcement learning control model trained for a first condition regarding a state before a current temperature of the target points converges to the target temperature.

12 Claims, 9 Drawing Sheets

METHOD AND APPARATUS FOR CONTROL ENERGY MANAGEMENT SYSTEM BASED ON REINFORCEMENT LEARNING

CROSS-REFERENCE TO RELATED APPLICATIONS

This application claims priority to and the benefit of Korean Patent Application No. 10-2020-0142112 filed in the Korean Intellectual Property Office on Oct. 29, 2020, and No. 10-2021-0038648 filed in the Korean Intellectual Property Office on Mar. 25, 2021, the entire contents of which are incorporated herein by reference.

BACKGROUND

Technical Field

The present disclosure relates to a method for controlling an energy management system, and more particularly, to a method for controlling an energy management system based on reinforcement learning using a neural network.

Description of the Related Art

In the related art, as a control method for energy management, a proportional-integral-differential (PID) control method based on a feedback is used. That is, an error is calculated by comparing an output value of a control target and a reference value which is a size of a desired output, and a control is performed based on the calculated error.

However, the existing PID control method has a disadvantage in that a convergence speed of a control target output value is slow and oscillates. A case where the convergence speed of the output value is low and oscillates means that there is overshooting of the output value in a positive direction and a negative direction, and this consequently causes a waste of energy sources on a control process.

Accordingly, in the art, a demand for provision of a solution for a stable control method has increased.

Korean Patent Registration No. "KR2133737" discloses a system and a method for control parcels sorted based on multi agent reinforcement learning.

BRIEF SUMMARY

The present disclosure is contrived in response to the above-described background art, and has been made in an effort to provide a method for controlling an energy management system based on reinforcement learning using a neural network.

An embodiment of the present disclosure provides a method for controlling an energy management system (EMS) that is performed by a computing device including at least one processor. The method may include: acquiring a target temperature of one or more target points; and controlling one or more control variables using a reinforcement learning control model trained for a first condition regarding a state before a current temperature of the target points converges to the target temperature.

In an alternative embodiment, the reinforcement learning control model may include a first control agent trained for controlling a first control variable, and a second control agent trained for controlling a second control variable.

In an alternative embodiment, the first control variable is an output of a compressor, and the second control variable is a degree of opening and closing of a valve.

In an alternative embodiment, the method may further include controlling the one or more control variables using the reinforcement learning control model trained for a second condition regarding a state after the current temperature of the target points converges to the target temperature.

In an alternative embodiment, the state information that the reinforcement learning control model acquires from the environment is first state information that includes at least one of state data on temperature, state data on an output of a compressor, and state data on a degree of opening and closing of a valve.

In an alternative embodiment, the reinforcement learning control model may include an artificial neural network layer including at least one node, and the training method of the reinforcement learning control model may include acquiring, by the reinforcement learning control model, state information from an environment including at least one sensor, controlling, by the reinforcement learning control model, one or more control variables based on the state information, acquiring, by the reinforcement learning control model, updated state information from the environment as a result of controlling a control variable, and training the reinforcement learning control model based on a reward acquired from the environment as the result of controlling the control variable.

In an alternative embodiment, the reward may include at least one of a reward calculated based on a current temperature and a target temperature of a target point, a reward calculated based on a total amount of work, or a reward calculated based on a current indirect indicator and a target indirect indicator.

In an alternative embodiment, the training of the reinforcement learning control model based on the reward may include, in the case of the first condition, training a first control agent included in the reinforcement learning control model based on the reward calculated based on the current temperature and the target temperature of the target point and training a second control agent included in the reinforcement learning control model based on the reward calculated based on the total amount of work.

In an alternative embodiment, the training of the reinforcement learning control model based on the reward may include, in the case of the second condition, training a first control agent included in the reinforcement learning control model based on the rewards calculated based on the current temperature, the target temperature, and the total amount of work of the target point, and training a second control agent included in the reinforcement learning control model based on the reward calculated based on the total amount of work.

In an alternative embodiment, the method may further include acquire a target indirect indicator corresponding to the acquired target temperature.

In an alternative embodiment, the target indirect indicator may be a value predetermined according to the target temperature or a value acquired from the environment through at least one sensor when the reinforcement learning control model trained to control one or more control variables based on the first state information converges the current temperature of the target point to the target temperature as a result of controlling one or more control variables.

In an alternative embodiment, the state information which the reinforcement learning control model acquires from the environment may be second state information acquired by additionally adding the state data for the indirect indicator to the first state information including at least one of state data for the temperature, state data for the output of the compressor, and state data for the degree of opening/closing of the valve.

In an alternative embodiment, the training method of the reinforcement learning control model for the second condition regarding state after the current temperature of the target points converges to the target temperature may include: training a first control agent comprised in the reinforcement learning control model, based on a reward computed based on the current temperature of the target points, the target temperature, and total amount of work; and training a second control agent comprised in the reinforcement learning control model, based on a reward calculated based on a current indirect indicator and the target indirect indicator.

Another embodiment of the present disclosure provides a computer program stored in a computer readable storage medium. When the computer program is executed in one or more processors, the computer program causes the following operations to be performed for controlling an energy management system (EMS), and the operations may include: acquiring a target temperature of one or more target points; and controlling one or more control variables using a reinforcement learning control model trained for a first condition regarding a state before a current temperature of the target points converges to the target temperature.

Still another embodiment of the present disclosure provides an apparatus for controlling an energy management system (EMS). The apparatus may include: one or more processors; a memory; and a network unit, and the one or more processors may be configured to acquire a target temperature of one or more target points; and control one or more control variables using a reinforcement learning control model trained for a first condition regarding a state before a current temperature of the target points converges to the target temperature.

According to embodiments of the present disclosure, a method for controlling an energy management system based on reinforcement learning using a neural network can be provided.

DETAILED DESCRIPTION

Figure 1:
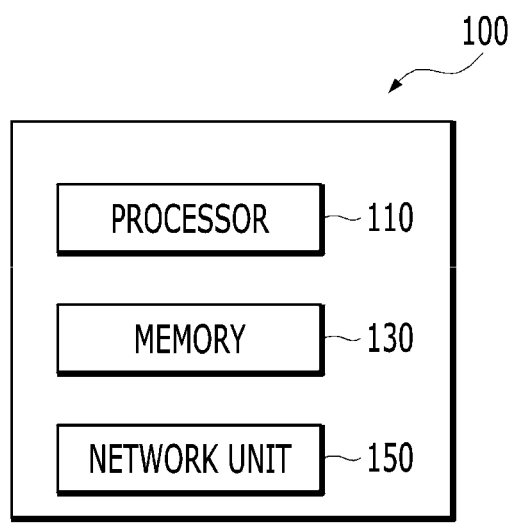
FIG. 1 is a block diagram of a computing device for controlling an energy management system according to an embodiment of the present disclosure.

Various embodiments will now be described with reference to drawings. In the present specification, various descriptions are presented to provide appreciation of the present disclosure. However, it is apparent that the embodiments can be executed without the specific description.

"Component," "module," "system," and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A,", "a case including only B," and "a case in which A and B are combined."

Those skilled in the art may readily recognize that various illustrative logical blocks, configurations, modules, circuits, means, logic, and algorithm steps described in connection with the embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

FIG. 1 is a block diagram of a computing device for controlling an energy management system according to an embodiment of the present disclosure.

A configuration of the computing device 100 illustrated in FIG. 1 is only an example shown through simplification. In an embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an embodiment of the present disclosure. According to an embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an embodiment of the present disclosure, processors of a plurality of computing devices may be used together to process the learning of the network function and the data classification using the network function. Further, the computer program executed in the computing device according to an embodiment of the present disclosure may be a CPU, GPGPU, or TPU executable program.

According to an embodiment of the present disclosure, the memory 130 may store any type of information generated or determined by the processor 110 or any type of information received by the network unit 150.

According to an embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

In respect to the network unit 150 according to an embodiment of the present disclosure, an arbitrary wired/wireless communication network which may transmit/receive an arbitrary type of data and signal may be included in the network expressed in the present disclosure.

In the present disclosure, the network unit 150 may be configured regardless of communication modes such as wired and wireless modes and constituted by various communication networks including a personal area network (PAN), a wide area network (WAN), and the like. Further, the network may be known World Wide Web (WWW) and may adopt a wireless transmission technology used for short-distance communication, such as infrared data association (IrDA) or Bluetooth.

The techniques described in this specification may also be used in other networks in addition to the aforementioned networks.

A computing device 100 according to the present disclosure may efficiently control an energy management system. The energy management system according to the present disclosure may include at least one of a control server, a measurement sensor, a pipe, a valve, a condenser, an evaporator, and a compressor as one component. The control server may control or observe a plurality of other components included in the energy management system through transmission/reception of an electric signal based on wired/wireless communication. As an embodiment, the control server may exist apart from a computing device according to the present disclosure. In this case, the control server includes a processor (not illustrated), a memory (not illustrated), and a network unit (not illustrated), and receives a control signal according to a computation result of the computing device to control the energy management system. As another embodiment, the control server of the energy management system may also include respective components of the computing device. The measurement sensor may include, for example, a temperature sensor, a humidity sensor, an ultrasonic sensor, an acceleration sensor, an infrared sensor, a time sensor, a current sensor, a voltage sensor, etc. The pipe may be a passage in which refrigerant moves. The valve may be a component for adjusting an amount of refrigerant which flows in the pipe. The condenser may be a component for converting gaseous refrigerant into liquid refrigerant. The evaporator may be a component for converting the liquid refrigerant into the gaseous refrigerant. The compressor may be a component for compressing low-temperature and low-pressure gaseous refrigerant and making the compressed gaseous refrigerant into high-temperature and high-pressure gaseous refrigerant.

In an embodiment of the present disclosure, it will be apparent to those skilled in the art that the energy management system may include other components for performing energy management, and only some of the disclosed components may also constitute the energy management system.

In the present disclosure, a "control variable" may mean a variable with which the computing device according to the present disclosure may directly adjust a value by setting one or more components included in the energy management system as a control target. The control variable may include, for example, at least one of a size of a compressor output, a degree of opening and closing of the valve, a size of a cooler output, a size of an evaporator output, or a size of a condenser output. The size of the compressor output may include, for example, a size of a rotational speed of a compressor turbine, a size of a compressor output voltage, a size of a compressor output current, etc. In the present disclosure, a term called the "control variable" may be used interchangeably with an "independent variable," an "operating factor," an "independent factor," etc.

In the present disclosure, a "dependent variable" may mean a value or a variable acquired by controlling the control variable by setting one or more components included in the energy management system as the control target by the computing device according to the present disclosure. The dependent variable may be measured by one or more sensors which exist in the energy management system. The dependent variable may include, for example, a temperature, a time, an acceleration, a voltage, etc. In the present disclosure, a term called the "dependent variable" may be used interchangeably with an "instrumentation value" a "measurement value," a "dependent factor," etc.

The computing device according to the present disclosure controls one or more independent variables through an artificial neural network model trained based on reinforcement learning to efficiently control the energy management system. A structure and a learning method of the artificial neural network model trained based on reinforcement learning will be hereinbelow described in detail with reference to FIGS. 2 and 3.

In the present disclosure, a "control" of the energy management system through the computing device may mean adjusting one or more independent variables so that values of one or more dependent variables reach a specific target value in a condition or a scenario given through the computing device. The "control" may mean a control for a multi-input multi-output (MIMO) system. The MIMO system may be, for example, a system that performs a control for the system by receiving degree of opening and closings of one or more valves and RPMs of one or more compressors as an input, and then outputs values of one or more dependent variables through a plurality of sensors included in the system.

In the present disclosure, an "efficient control" of the energy management system through the computing device may include a control for at least one independent variable which allows values of one or more dependent variables to reach one or more target values corresponding to the respective dependent variables within a shortest time. Alternatively, the "efficient control" may include a control for at least one independent variable which allows the values of one or more dependent variables to reach one or more target values corresponding to the respective dependent variables, but allows a total work of a total system becomes minimal. For example, the one or more target values may include a first target value of a first dependent variable and a second target value of a second dependent variable, and in this case, at least one independent variable which becomes a direct control target may be the degree of opening and closing of the valve and the RPM of the compressor. The first target value and the second target value may be target values which are independently determined without an interrelationship.

Alternatively, when the first target value is determined, the second target value may also be a value dependent on the first target value as the second target value is determined according to the determined first target value. For example, the second target value may be an average value, a differential value, and the like of the first target value. In the continued example, the "efficient control" of the energy management system may be controlling the valve and the compressor so that the first dependent variable and the second dependent variable reach the first target value and the second target value, respectively, but a total amount of work becomes minimal. Specific examples regarding the "control" and "efficient control" are just one example for implementation and do not limit the present disclosure.

The computing device according to the present disclosure controls one or more independent variables through the trained reinforcement learning control model to efficiently control the energy management system. The structure of the reinforcement learning control model according to the present disclosure will be described in detail with reference to FIG. 2.

Figure 2:
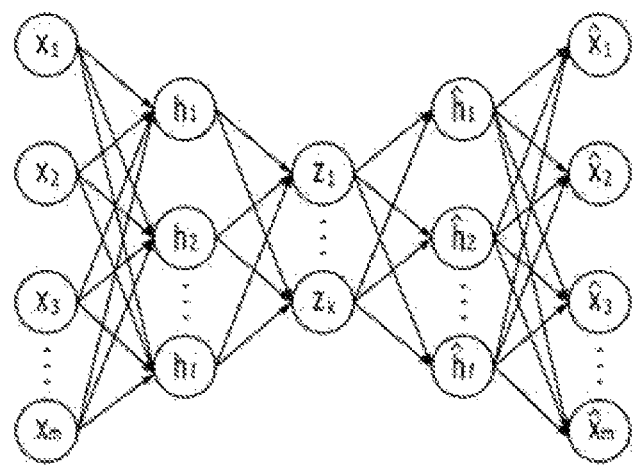
FIG. 2 is a schematic view illustrating a network function according to an embodiment of the present disclosure.

FIG. 2 is a schematic view illustrating a network function according to an embodiment of the present disclosure. The reinforcement learning control model according to the present disclosure may include at least one node. The reinforcement learning control model according to the present disclosure may have a structure including one or more neural network layers.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include at least one node. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a selected or desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another embodiment of the present disclosure, the number of nodes of the input layer may be larger than the number of nodes of the output layer, and the neural network may be a neural network of a type in which the number of nodes increases from the input layer to the hidden layer. The neural network according to still yet another embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to reduce or minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (e.g., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (e.g., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

The computing device 100 according to the present disclosure may train the reinforcement learning control model based on the reinforcement learning method.

The reinforcement learning is a method for selecting an action by the artificial neural network model and training the artificial neural network model based on a reward given to the selected action. A reward given to the artificial neural network model in the process of the reinforcement learning may be a reward acquired by accumulating results of various actions. The reinforcement learning generates the artificial neural network model which allows the reward or a return to become maximal by considering various states and a reward according to the activation through learning. In the present disclosure, the artificial neural network model based on reinforcement learning is usable interchangeably with an "agent" as a subject for determining the action. In the present disclosure, an "environment (Env)" may be used as a concept corresponding to the agent. The reinforcement learning method based on the agent and the environment will be described in detail with reference to FIG. 3.

Figure 3:
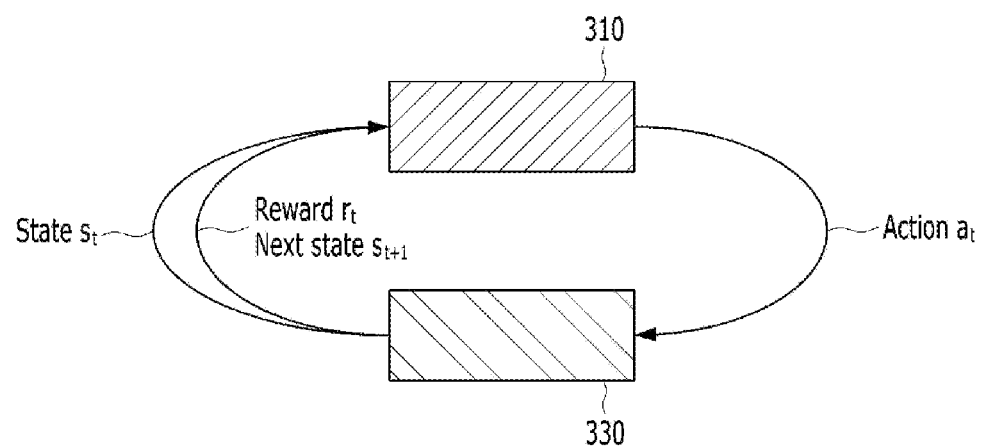
FIG. 3 is a conceptual view illustrating an agent and an environment in order to describe a reinforcement learning method.

FIG. 3 is a conceptual view illustrating an agent and an environment in order to describe a reinforcement learning method. An environment 330 may provide, to an agent 310, state information which may become a ground for determining the action. Thereafter, the agent 310 may determine the action based on the state information acquired from the environment 330. When the agent 310 hands over the determined action to the environment 330, the agent 310 may receive the reward based on the action and next state information from the environment 330. When a reward function which becomes a criterion for which the environment 330 determines the reward and a transition probability distribution function which becomes a determination criterion of the next state information after the environment 330 receives the action from the agent 310 may be known, the reinforcement learning is referred to as "model-based" reinforcement learning. On the contrary, when the agent 310 may not know the reward function of the environment 330 and the transition probability distribution function of the environment 330, the reinforcement learning is referred to as "model-free" reinforcement learning. When the state information and the next state information or the state information and updated state information are expressed in relation to a time t, the agent 310 determines an arbitrary action $A_t$ according to a probability distribution of available actions based on state information $S_t$ acquired from the environment 330 at an arbitrary time t and receives updated state information $S_{t+1}$ and a reward $R_t$ from the environment 330. The agent 310 learns a policy to increase or maximize reward values accumulated in the given environment 330 based on the interaction. The policy may mean a set regarding a probability that the agent 310 will conduct a specific action for a specific state. In the present disclosure, the environment 330 may include a model which may give a state and a reward for the reinforcement learning control model. The environment 330 as a virtual environment stored in an internal memory 130 in the computing device 100 may calculate the state and the reward apart from the reinforcement learning control model. The environment 330 may exist outside the computing device 100, but may also transmit a state and a reward for a control result of the reinforcement learning control model to the computing device 100. The environment 330 may include one or more physical sensors for the energy management system, but calculate the state and the reward based on a measurement value received from the physical sensor.

In the present disclosure, the method for determining the action by the agent may be, for example, based on at least one of a value-based action determining method, a police-based action determining method, and a both value and policy based action determining method. The value-based action determining method is a method for determining an action giving a highest value in each state based on a value function. An example of the value-based action determining method may include Q-learning, Deep Q-Network (DQN), etc. The policy-based action determining method is a method for determining the action based on a final return and a policy function without the value function. An example of the policy-based action determining method may include a Policy Gradient technique, etc. Both value and policy based action determining method is a method for determining the action of the agent through learning by a scheme in which the value function evaluates the action when the policy function determines the action. The both value and policy based action determining method may include, for example, a Soft Actor-Critic algorithm, etc. A description of specific contents related to the reinforcement learning model is specifically discussed in a thesis "Soft Actor-Critic, Off-Policy Maximum Entropy Deep Reinforcement Learning with a Stochastic Actor" (publication date: Aug. 8, 2018, by: Tuomas Haarnoja, Aurick Zhou, Pieter Abbeel, Sergey Levine), the entire contents of which are incorporated herein by a reference.

The method for controlling the energy management system performed by the computing device 100 according to the present disclosure may include acquiring target temperatures of one or more target points and controlling one or more control variables by using a reinforcement learning control model trained for a first condition regarding a state before a current temperature of the target point converges to the target temperature. The target point may include a predetermined point on the energy management system such as the evaporator. In some embodiments, the target point may include a point such as the condenser, the compressor, the valve, or a specific point where a temperature control is required.

The reinforcement learning control model according to the present disclosure may be differently trained under different conditions based on the temperature. The method for training the reinforcement learning control model differently under different conditions based on the temperature may include, for example, dividing into a case where the temperature is less than a specific value and a case where the temperature is equal to or more than a specific value, and differently configuring the state information or the reward given to the reinforcement learning control model in each temperature section. In the present disclosure, the "first condition" may include a state before the current temperature of the target point converges to the target temperature. In the present disclosure, the "second condition" may include a state after the current temperature of the target point converges to the target temperature. Accordingly, the method for controlling the energy management system performed by the computing device 100 according to the present disclosure may further include controlling one or more control variables by using the reinforcement learning control model trained for the second condition regarding the state after the current temperature of the target point converges to the target temperature. The specific training method will be described below in detail.

The reinforcement learning control model trained for each condition based on the temperature according to the present disclosure may control the energy management system so that the current temperature of the target point converges to the target temperature as soon as possible or the current temperature of the target point converges to the target temperature while consuming minimum energy under the first condition.

Further, the reinforcement learning control model trained according to the present disclosure may efficiently control the energy management system after the temperature converges under the second condition. According to the present disclosure, as compared with the existing PID control in which the control is performed by targeting only efficiency after temperature convergence, there is an effect that an efficient control for a process before the control is possible by considering even a process before the temperature convergence.

The reinforcement learning control model according to the present disclosure may include a first control agent trained for controlling a first control variable and a second control agent trained for controlling a second control variable.

Figure 4:
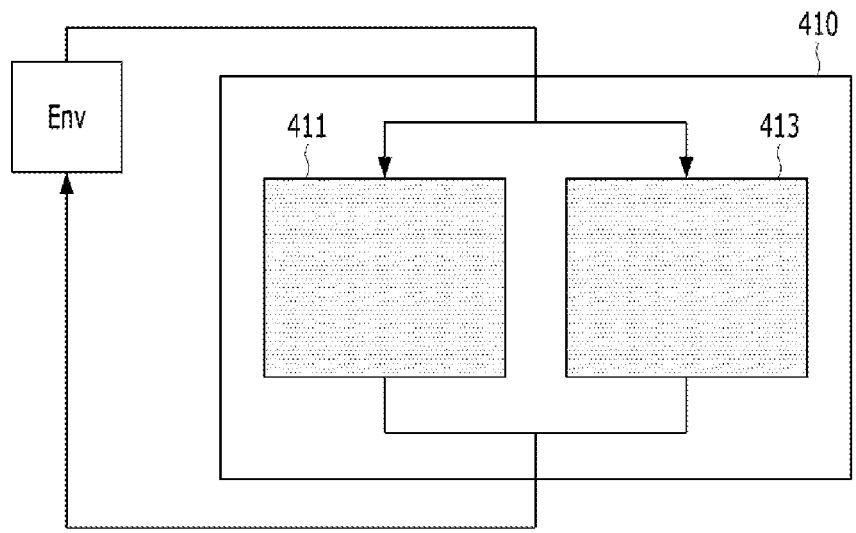
FIG. 4 is a conceptual view exemplarily illustrating a reinforcement learning control model including a plurality of control agents, and an environment according to the present disclosure.

FIG. 4 is a conceptual view exemplarily illustrating a reinforcement learning control model including a plurality of control agents, and an environment according to the present disclosure. A plurality of control agents included in a reinforcement learning control model 410 may be trained based on different reward functions. The plurality of control agents included in a reinforcement learning control model may determine an action for different control targets. The action for the different control targets may include adjustment for an increase/decrease of the control variable, etc. The reinforcement learning control model according to the present disclosure includes the plurality of control agents to separately control targets sensitive to respective targets when there is a plurality of targets. The plurality of targets may include a plurality of reward functions considered during reinforcement learning.

The reinforcement learning control model 410 according to the present disclosure may include one or more control agents as illustrated in FIG. 4. Separating the reinforcement learning control model 410 into a first control agent 411 and a second control agent 413 in order to control different control variables may be based on an empirical knowledge of the control of the energy management system. As an example, the first control variable and the second control variable may differently influence efficiency of an entire system before and after the temperature converges. For example, under the first condition which is the state before the temperature converges, the first control variable exerts a larger influence on the entire system than the second control variable, and under the second condition which is the state after the temperature converges, the first control variable and the second control variable may exert a similar influence on the entire system. In such a case, rapidly converging the temperature by efficiently controlling only the first control variable or reducing/minimizing the amount of a work for controlling the first control variable under the first condition may be more efficiently controlling the entire system. As another example, the first control variable and the second control variable may have different reactivities to the system. That is, a response time from a time of controlling the first control variable up to a response time up to a time when the dependent variable of the system is changed and a response time from a time of controlling the second control variable up to the time where the dependent variable of the system is changed may be different from each other. Even in this case, when the first control variable and the second control variable are simultaneously controlled, values may oscillate due to a difference in reactivity, and as a result, it may be effective to individually control respective control variables through separate control agents as in the present disclosure.

According to the present disclosure, the first control variable controlled by the first control agent 411 may be the output of the compressor and the second control variable controlled by the second control agent 413 may be the degree of opening and closing of the valve. The output of the compressor may include a magnitude of a voltage, a current, or a power applied to the compressor. The output of the compressor may include an rpm of a propeller included in the compressor, an RPM, etc. The degree of opening and closing of the valve may be expressed, for example, as a scalar value meaning a ratio of an area when the valve is fully opened and when the valve is partially closed. The reinforcement learning control model according to an embodiment of the present disclosure separately controls the output of the compressor in which the influence exerted on the system is large and the reactivity is rapid and the degree of opening and closing of the valve in which the influence exerted on the system is relatively small and the reactivity is slow as compared with the output of the compressor to prevent two values which are dependent on each other from being increased or decreased meaninglessly and increase total system control efficiency.

The reinforcement learning control model according to the present disclosure may include an artificial neural network layer including at least one node. The training method of the reinforcement learning control model according to the present disclosure may include acquiring, by the reinforcement learning control model, state information from an environment including at least one sensor, controlling, by the reinforcement learning control model, one or more control variables based on the state information, acquiring, by the reinforcement learning control model, updated state information from the environment as a result of controlling a control variable, and training the reinforcement learning control model based on a reward acquired from the environment as the result of controlling the control variable.

The environment may include at least one component on the energy management system. As described above, the environment may receive the action from the reinforcement learning control model and transmit the next state information to the reinforcement learning control model based on the received action. The environment may also determine the reward based on the action received from the reinforcement learning control model. The environment may include at least one sensor in order to generate the state information. For example, when the state information includes the temperature or a change amount of the temperature, the at least one sensor may include the temperature sensor.

The reinforcement learning control model according to the present disclosure may be trained based on a plurality of episodes. The episode may mean a sequence (of the state, the action, and the reward) from an initial state up to a terminal state. The terminal state may also be derived when a predetermined end condition is satisfied and also derived when a step of a predetermined size is performed. The step indicates at least one action unit in which the reinforcement learning control model receives the state, determines the action, and then receives the reward for the action or updated state information. One episode may be constituted by predetermined N (e.g., N=200) steps.

As an embodiment regarding a reinforcement learning process of the model or an action of the computing device 100 included in the learning process of the model according to the present disclosure, the computing device 100 may acquire learning data for each step included in at least one episode. For example, the computing device 100 may store, in the memory 130 as learning data, state information $S_t$ which the reinforcement learning control model acquires from the environment, an action $A_{t+1}$ which the reinforcement learning control model determines based on the state information, and a reward $R_{t+1}$ which the reinforcement learning control model acquires from the environment as a result of the action in the form of a sequence pair of (the state information $S_t$, the action $A_{t+1}$, and the reward $R_{t+1}$), with respect to an arbitrary time t. In the present disclosure, the action which the reinforcement learning control model determines based on the state information may include a control for one or more control variables. The time t of the learning data may proceed to a time t+1 for a next state when the reinforcement learning control model acquires the updated state information from the environment as the result of the determined action. The form of the learning data and the description of the time are just examples, and reinforcement learning control model and do not limit the present disclosure.

The computing device 100 may train the reinforcement learning control model based on at least one learning data. As an embodiment, the computing device 100 may train the reinforcement learning control model based on learning data corresponding to each step whenever each step ends. As another embodiment, the computing device 100 may train the reinforcement learning control model based on a learning data set including the learning data for each of the plurality of steps whenever each episode including the plurality of steps ends. As yet another embodiment, the computing device 100 may also train the reinforcement learning control model based on the learning data set including the learning data for each corresponding step after a step of a predetermined batch size is performed. The batch size may be predetermined to include learning data for one or more steps.

According to the present disclosure, the process in which the computing device 100 trains the reinforcement learning control model may include a process of modifying a weight or a deflection value of each node included in the reinforcement learning control model. The process of modifying the weight or the deflection value of each node included in the reinforcement learning control model may be based on a backpropagation technique described above. In a detailed embodiment, when the reward included in the learning data for training the reinforcement learning control model is a positive number, an absolute value of the weight or deflection value of at least one node included in the reinforcement learning control model in order to calculate the corresponding reward may also be increased. On the contrary, when the reward included in the learning data for training the reinforcement learning control model is a negative number, the absolute value of the weight or deflection value of at least one node which involves in calculating the corresponding reward may be decreased. The training process of the reinforcement learning control model is described just for an illustrative purpose, and does not limit the present disclosure.

In the present disclosure, the reward which the reinforcement learning control model acquires from the environment as the result of the control for the control variable may include at least one of a reward calculated based on a current temperature and a target temperature of a target point, a reward calculated based on a total amount of work, or a reward calculated based on a current indirect indicator and a target indirect indicator.

The reward (first reward) calculated based on the current temperature and the target temperature of the target point may be based on a difference between the current temperature and the target temperature of the target point. Specifically, the first reward may be designed to have a high reward when the difference between the target temperature and the current temperature is less than a predetermined threshold and a relatively low reward when the difference between the target temperature and the current temperature is equal to or more than the predetermined threshold.

The reward (second reward) calculated based on the total amount of work may be based on a total amount of work calculated by the energy management system or the computing device 100. As an embodiment, the total amount of work may be, for example, a value measured by one or more sensors included in the environment. As another embodiment, the total amount of work may also be a value acquired by integrally calculating the size of the output of the compressor according to the time by the computing device 100. The second reward may be designed to have a range of a similar reward value to the first reward. In the second reward, the size of the reward may be designed to have a higher reward as the total amount of work is smaller.

The reward (third reward) calculated based on the current indirect indicator and the target indirect indicator may be based on a difference between the current indirect indicator and the target indirect indicator. Specifically, the current indirect indicator may be a value measured by one or more sensors included in the environment. For example, the current indirect indicator may include the temperature of the condenser, the temperature of the evaporator, the temperature of the expansion valve, a subcool of the condenser, a subheat of the evaporator, etc., included in the energy management system. Specifically, the third reward may be designed to have a high reward when the difference between the target indirect indicator and the current indirect indicator is less than a predetermined threshold and a relatively low reward when the difference between the target indirect indicator and the current indirect indicator is equal to or more than the predetermined threshold similarly to the first reward.

In the present disclosure the target indirect indicator may be a value dependent on the target temperature of the target point. In an embodiment of the present disclosure, the target indirect indicator may include a subcool or a subcooled temperature. The subcool may be a difference value between a theoretical condensation temperature and an actual measurement temperature of the refrigerant used in the energy management system. The subcooled temperature may mean the actual measurement temperature. The subcool and the subcooled temperature will be hereinafter described in more detail with reference to FIG. 5.

Figure 5:
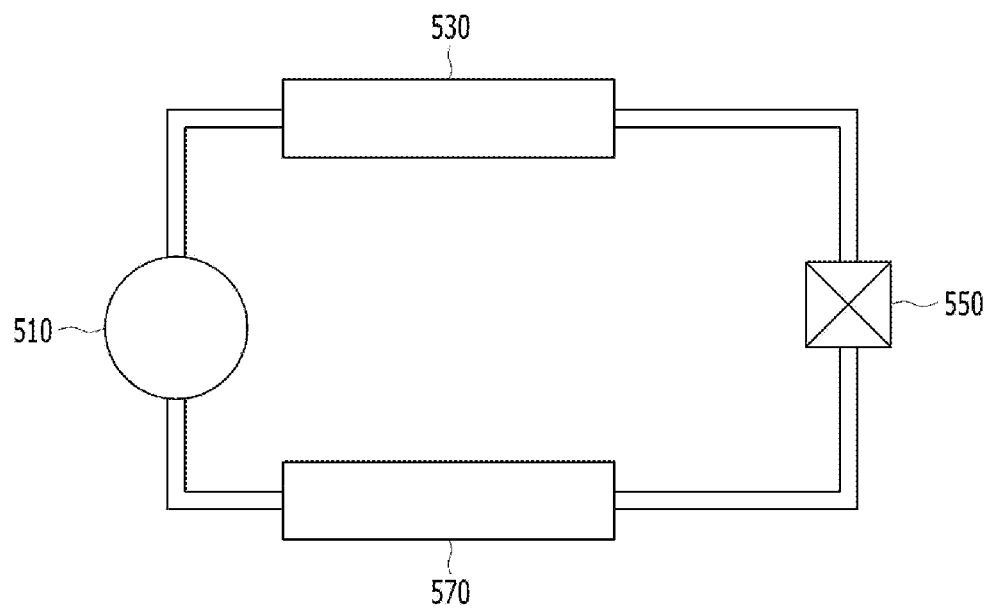
FIG. 5 is a diagram of a refrigeration cycle included in an energy management system according to an embodiment of the present disclosure.

FIG. 5 is a diagram of a refrigeration cycle included in an energy management system according to an embodiment of the present disclosure. In FIG. 5, reference numerals 510, 530, 550, and 570 represent the compressor, the condenser, the expansion valve, and the evaporator, respectively. The 'subcool' is a physical amount which may be considered in the control of the energy management system. The subcool may be a physical amount meaning a difference between a theoretical condensation temperature at which a phase transition occurs from gas to a liquid when gaseous refrigerant passes through the condenser 530 and an actual measurement temperature for refrigerant just before actually liquefied liquid refrigerant flows from the condenser 530 to the expansion valve 550. The theoretical condensation temperature may be a condensation temperature of a Mollier chart or a pressure-enthalpy (P-H) chart. The actual measurement temperature may be a value measured in the vicinity of a starting point of the valve extracted from the condenser 530. The subcool may be determined by a difference between a target theoretical condensation temperature and the actual measurement temperature. In some embodiments, it may be beneficial for the subcool to have a value for the liquid refrigerant liquefied from the gaseous refrigerant is in a liquid state. The subcooled temperature may be measured by the actual measurement temperature. In other embodiments, the subcool may be a value required to guarantee that the liquid refrigerant liquefied from the gaseous refrigerant is in a liquid state.

In the art related to the energy management system, a fact that an appropriate subcooled temperature should be maintained for efficiency of energy management is well known. When the appropriate subcool is not maintained, and the theoretical condensation temperature and the actual measurement temperature are equal or similar to each other, a refrigerant compression rate decreases while a gas phase refrigerant ratio in refrigerant introduced into the expansion valve increases, thereby losing the efficiency. Unlike this, when the appropriate subcool is not maintained, and the actual measurement temperature is lower than the theoretical condensation temperature over a set subcool, it is guaranteed that the refrigerant is maintained as a liquid phase, but excessive energy is used in order to maintain the subcool, thereby losing total efficiency. Accordingly, maintaining the appropriate subcool or subcooled temperature may be beneficial for the efficiency of the energy management. According to the present disclosure, the reinforcement learning control model trained based on the second state information may maintain the appropriate subcooled temperature while converging the current temperature of the target point to the target temperature. This will be described below in detail.

The reinforcement learning control model according to the present disclosure may be trained according to types of different state information. The reinforcement learning control model trained according to the first state information among the types of different state information may be trained to control one or more control variables by receiving the target temperature of the target point. In this case, the reinforcement learning control model trained according to the first state information has an effect of capable of acquiring a target subcooled temperature corresponding to the target temperature of the target point as a result of controlling the energy management system so that the efficiency of the entire energy management system becomes optimal with respect to the temperature. The target subcooled temperature may be acquired by being observed through one or more sensors when the current temperature of the target point is converged to the target temperature in the process of controlling the energy management system by the reinforcement learning control model trained according to the first state information. Further, the reinforcement learning control model trained according to the second state information among the types of different state information may be trained to control one or more control variables based on the target temperature of the target point and the target subcooled temperature corresponding to the target temperature. Hereinafter, the reinforcement learning control model trained according to the types of different state information will be described in more detail.

The state information which the reinforcement learning control model acquires from the environment may be first state information including at least one of state data for the temperature, state data for the output of the compressor, and state data for the degree of opening and closing of the valve according to the present disclosure. Specifically, the first state information may include at least one of a temperature at a time t−1, a temperature at a time t, a difference between the a target temperature and the temperature at the time t, a compressor output at the time t−1, and a valve degree of opening and closing at the time t−1. The reinforcement learning control model may acquire the first state information from the environment, control one or more control variables based thereon, and then acquire updated first state information as a result of the control. Further, the reinforcement learning control model may also acquire the reward from the environment as a result of the control for one or more control variables based on the first state information. Hereinafter, the method for training the reinforcement learning control model acquiring the first state information as the state information will be described separately under the first condition and the second condition according to whether the current temperature of the target point converges to the target temperature.

In an embodiment of the present disclosure, the training of the reinforcement learning control model controlling one or more control variables based on the first state information based on the reward may include, in the case of the first condition, training a first control agent included in the reinforcement learning control model based on the reward calculated based on the current temperature and the target temperature of the target point and training a second control agent included in the reinforcement learning control model based on the reward calculated based on the total amount of work.

In another embodiment of the present disclosure, the training of the reinforcement learning control model controlling one or more control variables based on the first state information based on the reward may include, in the case of the second condition, training the first control agent included in the reinforcement learning control model based on the reward calculated based on the current temperature of the target point, the target temperature, the total amount of work and training a second control agent included in the reinforcement learning control model based on the reward calculated based on the total amount of work.

The first control agent included in the reinforcement learning control model trained based on the first condition and the first state information according to the present disclosure may be an agent for controlling the output of the compressor. The second control agent included in the reinforcement learning control model trained based on the first condition and the first state information according to the present disclosure may be an agent for controlling the degree of opening and closing of the valve. The reinforcement learning control model trained to control one or more control variables based on the first state information may train the reinforcement learning control model so that the current temperature of the target point rapidly converges to the target temperature by differentiating the types of rewards under the first and second conditions and the current temperature of the target point converges to the target temperature while reducing or minimizing the total amount of work.

In an embodiment of the present disclosure, the reinforcement learning control model trained based on the first state information is a model in which an indirect indicator is not reflected to training. The indirect indicator as an embodiment may include information related to a subcool or a subcooled temperature. That is, when one or more control variables of the energy management system are controlled by using the reinforcement learning control model trained based on the first state information, the energy management system may be controlled irrespective of the indirect indicator. In addition, after the current temperature of the target point converges to the target temperature by using the reinforcement learning control model trained based on the first state information, the computing device 100 may observe the indirect indicator from the environment through at least one sensor. This has an advantage in that a target indirect indicator corresponding to a specific target temperature may be acquired.

More specifically, as an embodiment of efficiently controlling the energy management system, when a target temperature and a target subcooled temperature determined according to the target temperature are set, and the current temperature of the target point reaches the target temperature and a current subcooled temperature on the energy management system reaches the target subcooled temperature, the energy management system may be efficiently controlled. However, in the related art, since only a PID control not considering the efficiency is possible, there is no method that may derive the target subcooled temperature corresponding to the target temperature, and the target subcooled temperature corresponding to the target temperature is set by relying on an experience of an expert in the corresponding field. On the contrary, the reinforcement learning control model trained based on the first state information according to the present disclosure may efficiently converge the current temperature of the target point to the target temperature without the subcooled temperature which is the indirect indicator. As a result, after the current temperature of the target point is converged to the target temperature, the temperature of the refrigerant included in the expansion valve which starts at the condenser is observed through at least one sensor included in the energy management system to acquire the target subcooled temperature corresponding to the target temperature. In other words, in the existing control scheme, all solution spaces should be completely enumerated in order to find the target subcooled temperature corresponding to the target temperature, but according to the present disclosure, the reinforcement learning control model trained based on the first state information is trained to incidentally acquire the target subcooled temperature corresponding to the target temperature.

The energy management system controlling method performed by the computing device 100 according to the present disclosure may further include acquiring a target indirect indicator corresponding to the acquired target temperature. In an embodiment of the present disclosure the target indirect indicator corresponding to the target temperature may be a measurement value which may be measured from at least one sensor included in the energy management system. Specifically, the target indirect indicator corresponding to the target temperature may include at least one of the subcool, the subcooled temperature, the subheat, and the subheated temperature described above. An example of the target indirect indicator is just one example, and does not limit the present disclosure.

In the present disclosure the target indirect indicator may be a value predetermined according to the target temperature. The predetermined value may be a value acquired when a user prestores the target indirect indicator corresponding to the target temperature in the memory 130. The predetermined value may also be empirically set to an optimal value corresponding to the target temperature and set to an arbitrary value corresponding to the target temperature for a reason such as safety.

In the present disclosure, the target indirect indicator may be a value acquired from the environment through at least one sensor when the reinforcement learning control model trained to control one or more control variables based on the first state information converges the current temperature of the target point to the target temperature as a result of controlling one or more control variables.

The state information which the reinforcement learning control model acquires from the environment according to the present disclosure may be second state information acquired by additionally adding the state data for the indirect indicator to the first state information including at least one of state data for the temperature, state data for the output of the compressor, and state data for the degree of opening and closing of the valve. Specifically, the first second state information may include at least one of a temperature at a time t−1, a temperature at a time t, a difference between the a target temperature and the temperature at the time t, a compressor output at the time t−1, and a valve degree of opening and closing at the time t−1, and additionally include at least one of an indirect indicator at the time t−1, an indirect indicator at the time t, and a difference between a target indirect indicator and the indirect indicator at the time t. The reinforcement learning control model may acquire the second state information from the environment, control one or more control variables based thereon, and then acquire updated second state information from the environment as a result of the control. Further, the reinforcement learning control model may also acquire the reward from the environment as a result of the control for one or more control variables based on the second state information. Hereinafter, the method for training the reinforcement learning control model acquiring the second state information as the state information will be described separately under the first condition and the second condition according to whether the current temperature of the target point converges to the target temperature.

In an embodiment of the present disclosure, the training of the reinforcement learning control model controlling one or more control variables based on the second state information based on the reward may include, in the case of the first condition, training a first control agent included in the reinforcement learning control model based on the reward calculated based on the current temperature and the target temperature of the target point and training a second control agent included in the reinforcement learning control model based on the reward calculated based on the total amount of work.

In another embodiment of the present disclosure, the training of the reinforcement learning control model controlling one or more control variables based on the second state information based on the reward may include, in the case of the second condition, training the first control agent included in the reinforcement learning control model based on the reward calculated based on the current temperature of the target point, the target temperature, the total amount of work and training a second control agent included in the reinforcement learning control model based on the reward calculated based on the current indirect indicator and the target indirect indicator.

In the present disclosure, the computing device 100 additionally applies a reward related to the indirect indicator to enable a control considering both the target temperature and the target indirect indicator when training the reinforcement learning control model controlling one or more control variables based on the second state information. The target indirect indicator may include, for example, a target subcool. As a result, there is an advantage in that the energy management system controlling method that performs the PID control for the target temperature and the target subcool in the related art may be more efficiently performed through the reinforcement learning control model according to the present disclosure. That is, the control in the related art shows a tendency in which the value oscillates as the temperature is converged to the target temperature in terms of characteristics of the PID control. On the contrary, the control using the reinforcement learning control model according to the present disclosure has an effect that the temperature of the target point is converged to the target temperature more rapidly than the control in the related art, and there is no abnormal noise to reduce the total amount of work required for the control.

Figure 6:
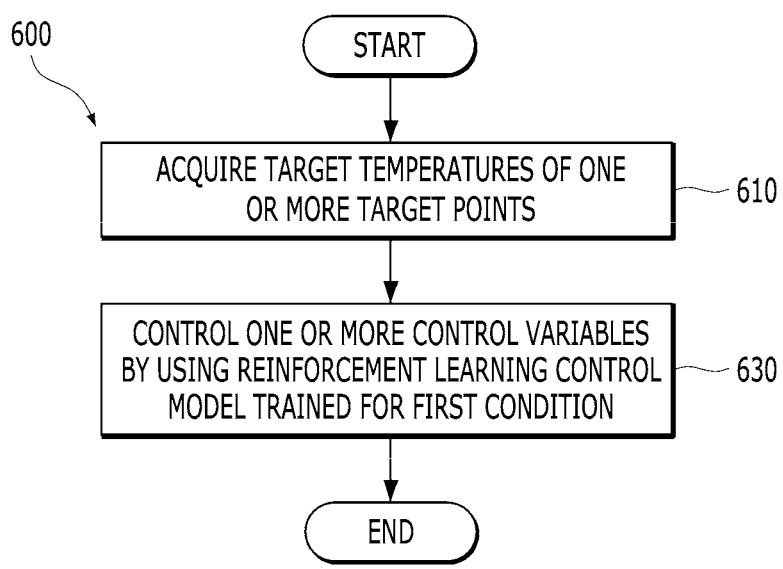
FIG. 6 is a flowchart showing a process in which a computing device controls an energy management system using a reinforcement learning control model according to an embodiment of the present disclosure.

FIG. 6 is a flowchart showing a process in which a computing device controls an energy management system using a reinforcement learning control model according to an embodiment of the present disclosure. In the energy management system controlling method by the computing device 100 according to the present disclosure, target temperatures of one or more target points may be acquired (610). The target point may be, for example, an evaporator. The computing device 100 according to the present disclosure may control one or more control variables by using a reinforcement learning control model trained for a first condition (630). The first condition may be a condition including a state before a current temperature of the target point converges to a target temperature. The computing device 100 according to the present disclosure may control the current temperature of the target point to converge to the target temperature by using the reinforcement learning control model trained for the first condition. When the current temperature of the target point converges to the target temperature, the control may be performed by using the PID control in the related art. Further, the method may additionally include controlling one or more control variables by using a reinforcement learning control model trained for a second condition even after the current temperature of the target point converges to the target temperature. The reinforcement learning control model trained for the first condition or second condition may be a control model trained based on first state information. The first state information may include at least one of a temperature at a time t−1, a temperature at a time t, a difference between the a target temperature and the temperature at the time t, a compressor output at the time t−1, and a valve degree of opening and closing at the time t−1. A control model trained based on the first state information may optimize efficiency without considering an indirect indicator, and control the energy management system.

Figure 7:
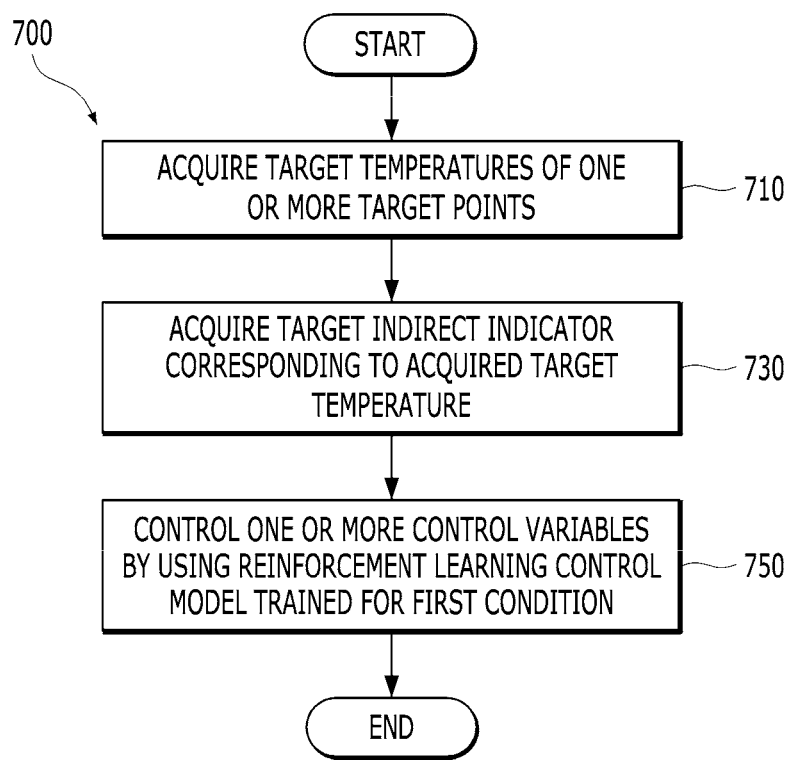
FIG. 7 is a flowchart showing a process in which a computing device controls an energy management system using a reinforcement learning control model according to another embodiment of the present disclosure.

FIG. 7 is a flowchart showing a process in which a computing device controls an energy management system using a reinforcement learning control model according to yet another embodiment of the present disclosure. The computing device 100 according to the present disclosure may acquire target temperatures of one or more target points (710). Thereafter, the computing device 100 according to the present disclosure may acquire a target indirect indicator corresponding to the acquired target temperature (730). The target indirect indicator may also be determined as a value stored in the memory 130 of the computing device 100 and also acquired based on a control result of a reinforcement learning control model already trained by the other state condition. This will be described below in detail with reference to the flowchart of FIG. 8. The computing device 100 according to the present disclosure may control one or more control variables by using a reinforcement learning control model trained for a first condition (750). The computing device 100 according to the present disclosure may control the current temperature of the target point to converge to the target temperature by using the reinforcement learning control model trained for the first condition. When the current temperature of the target point converges to the target temperature, the control may be performed by using the PID control in the related art. Further, the method may additionally include controlling one or more control variables by using a reinforcement learning control model trained for a second condition even after the current temperature of the target point converges to the target temperature. The reinforcement learning control model trained for the first condition or second condition may be a control model trained based on second state information. The second state information may further include at least one of an indirect indicator at the time t−1, an indirect indicator at the time t, and a difference between a target indirect indicator and the indirect indicator at the time tin addition to one or more data included in the first state information. The indirect indicator may be a subcooled temperature or a sub cool. The target indirect indicator as a value dependent on the target temperature may be a value determined according to the target temperature. The control model trained based on the second state information may consider both the target temperature and the target indirect indicator, and efficiently control one or more control variables of the energy management system.

Figure 8:
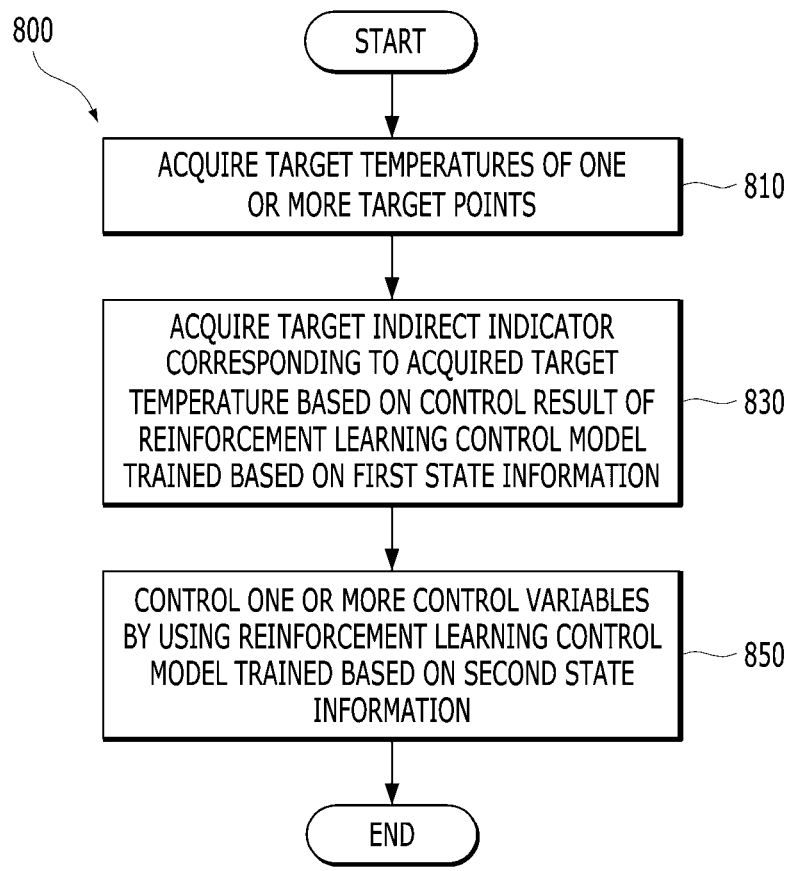
FIG. 8 is a flowchart showing a process in which a computing device controls an energy management system using a reinforcement learning control model according to yet another embodiment of the present disclosure.

FIG. 8 is a flowchart showing an energy management system controlling method using a reinforcement learning control model by a computing device according to yet another embodiment of the present disclosure. The computing device 100 according to the present disclosure may acquire target temperatures of one or more target points (810), and then acquire a target indirect indicator corresponding to the acquired target temperature. The computing device 100 may acquire the target indirect indicator corresponding to the acquired target temperature based on a control result of a reinforcement learning control model trained based on first state information (830). Thereafter, the computing device 100 may control one or more control variables by using a reinforcement learning control model trained based on second state information (850).

In an embodiment of the present disclosure, the computing device 100 may reinforce and train a first control model based on the first state information and reinforce and train a second control model based on the second state information. A neural network structure included in the first control model and the second control model may be individually stored in the memory 130. The computing device 100 acquire a target indirect indicator corresponding to a target temperature observed through one or more sensors included in the energy management system when a current temperature of a target point converges to a target temperature as a result of controlling one or more control variables included in the energy management system through the first control model. The target indirect indicator may be a subcooled temperature or a subcool. The computing device 100 may perform a control through the first control model for a plurality of target temperatures, and then acquire a target indirect indicator corresponding to each target temperature. The target indirect indicator corresponding to each of the plurality of target temperatures may also be stored in the memory 130 by forming a pair with the target temperature. Thereafter, the computing device 100 may acquire the target temperature of the target point, and then acquire the target indirect indicator based on the control result of the first control model as described above. Thereafter, the computing device 100 may control one or more control variables by using the second control model. For example, the second control model may allow the current temperature of the target point to converge to the target temperature and a current subcooled temperature on the system to converge to a target subcooled temperature. The second control model may substitute for the PID control performing a feedback control for the target temperature and the target subcooled temperature in the related art, and provide a control having higher efficiency.

Figure 9:
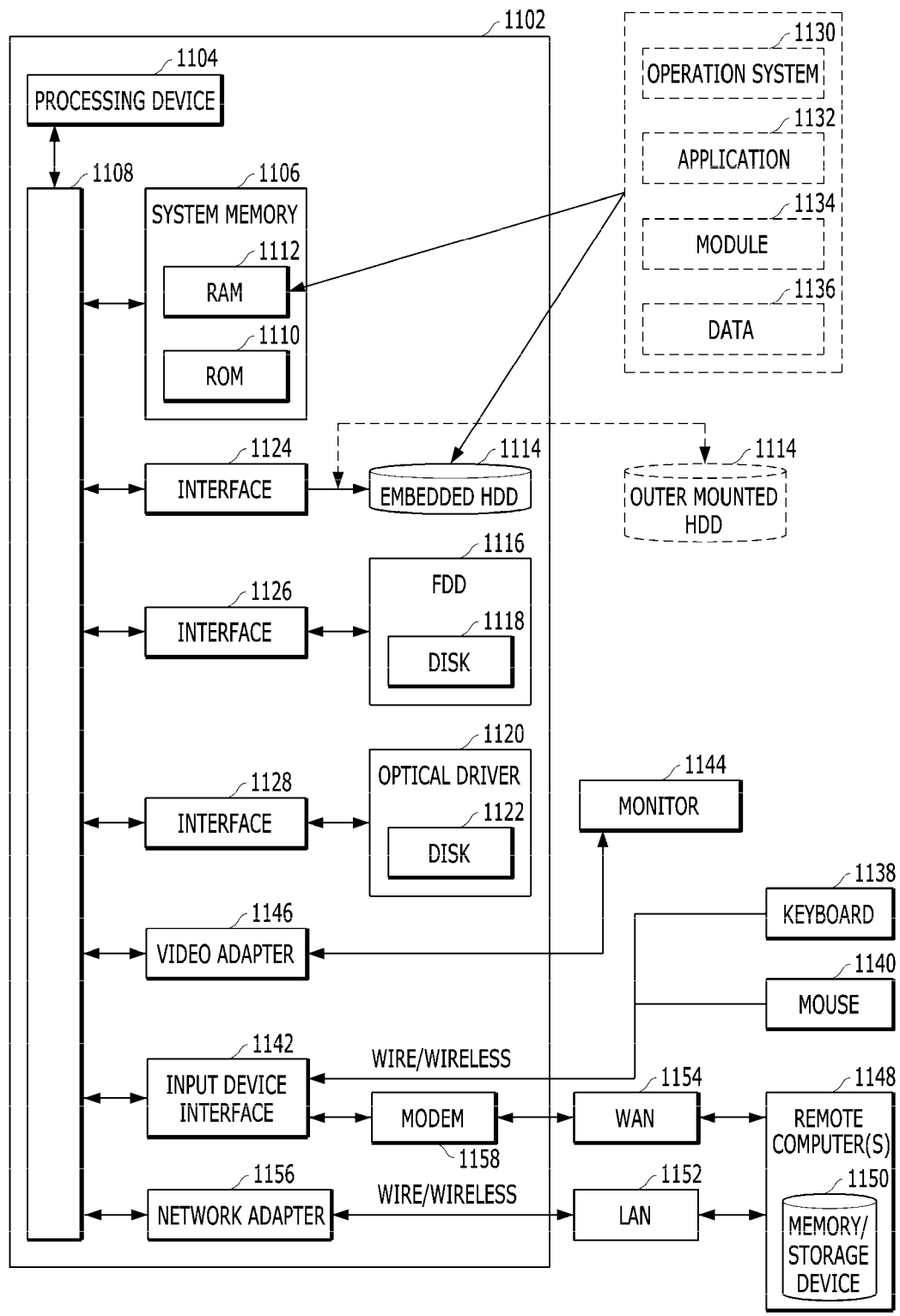
FIG. 9 is a simple and normal schematic view of a computing environment in which the embodiments of the present disclosure may be implemented.

FIG. 9 is a normal and schematic view of a computing environment in which the embodiments of the present disclosure may be implemented. It is described above that the present disclosure may be generally implemented by the computing device, but those skilled in the art will well know that the present disclosure may be implemented in association with a computer executable command which may be executed on one or more computers and/or in combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical disk drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is an example and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various logical blocks, modules, processors, means, circuits, and algorithm steps described in association with the embodiments disclosed herein may be implemented by electronic hardware, various types of programs or design codes (for easy description, herein, designated as software), or a combination of all of them. In order to clearly describe the intercompatibility of the hardware and the software, various components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be interpreted within the widest range which is coherent with the principles and new features presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling an energy management system (EMS) that is performed by a computing device including at least one processor, the method comprising:
acquiring a target temperature of one or more target points;
controlling one or more control variables using a reinforcement learning control model trained for a first condition regarding a state before a current temperature of the target points converges to the target temperature;
controlling the one or more control variables using the reinforcement learning control model trained for a second condition regarding a state after the current temperature of the target points converges to the target temperature; and
acquiring a target indirect indicator corresponding to the acquired target temperature,
wherein the reinforcement learning control model is trained based on a reward that is calculated differently for the first condition and the second condition respectively,
wherein the target indirect indicator includes a value obtained through at least one sensor from the environment, when the current temperature of the target points converges towards the target temperature, based on the reinforcement learning control model controlling one or more control variables, the reinforcement learning control model being trained to control one or more control variables based on a state information,
wherein a training method of the reinforcement learning control model for the second condition regarding state after the current temperature of the target points converges to the target temperature includes:
training a first control agent comprised in the reinforcement learning control model, based on a reward computed based on the current temperature of the target points, the target temperature, and total amount of work; and
training a second control agent comprised in the reinforcement learning control model, based on a reward computed based on a current indirect indicator and the target indirect indicator.

2. The method for controlling EMS of claim 1, wherein the reinforcement learning control model comprises:
a first control agent trained for controlling a first control variable; and
a second control agent trained for controlling a second control variable.

3. The method for controlling EMS of claim 2, wherein the first control variable and the second control variable are dependent on each other,
wherein the first control variable is an output of a compressor, and the second control variable is a degree of opening and closing of a valve, and
wherein the reinforcement learning control model separately controls the output of the compressor and the degree of opening and closing of the valve.

4. The method for controlling EMS of claim 1, wherein the reinforcement learning control model includes an artificial neural network layer including at least one node, and wherein a training method of the reinforcement leaning control model comprises:
acquiring the state information from an environment including at least one sensor, by the reinforcement learning control model;
controlling the one or more control variables based on the state information, by the reinforcement learning control model;
acquiring the state information updated from the environment as a result of controlling the control variables, by the reinforcement learning control model; and
training the reinforcement learning control model based on the acquired reward from the environment as the result of controlling the control variables.

5. The method for controlling the EMS of claim 4, wherein the reward comprises at least one of the followings:
- a reward computed based on the current temperature of the target points and the target temperature;
- a reward computed based on total amount of work; or
- a reward computed based on a current indirect indicator and the target indirect indicator.

6. The method for controlling the EMS of claim 1, wherein state information that the reinforcement learning control model acquires from the environment is
- first state information that includes at least one of state data on temperature, state data on an output of a compressor, and state data on a degree of opening and closing of a valve.

7. The method for controlling the EMS of claim 4, wherein the training the reinforcement learning control model based on the acquired reward from the environment as the result of controlling the control variables, in the first condition, comprises:
- training a first control agent comprised in the reinforcement learning control model, based on a reward computed based on the current temperature of the target points and the target temperature; and
- training a second control agent comprised in the reinforcement learning control model, based on a reward computed based on total amount of work.

8. The method for controlling the EMS of claim 4, wherein the training the reinforcement learning control model based on the acquired reward from the environment as the result of controlling the control variables, in the second condition, comprises:
- training a first control agent comprised in the reinforcement learning control model, based on the current temperature of the target points, the target temperature, and total amount of work; and
- training a second control agent comprised in the reinforcement learning control model, based on a reward computed based on the total amount of work.

9. The method for controlling the EMS of claim 1, wherein the target indirect indicator includes a pre-determined value according to the target temperature.

10. The method for controlling the EMS of claim 1, wherein state information that the reinforcement learning control model acquires from the environment is:
- second state information additionally including state data for an indirect indicator to first state information that includes at least one of state data on temperature, state data on an output of a compressor, and state data on a degree of opening and closing of a valve.

11. A non-transitory computer readable storage medium, wherein when the non-transitory computer readable storage medium is executed in one or more processors, the non-transitory computer readable storage medium causes the following operations to be performed for controlling an energy management system, the operations comprising:
- acquiring a target temperature of one or more target points;
- controlling one or more control variables using a reinforcement learning control model trained for a first condition regarding a state before a current temperature of the target points converges to the target temperature;
- controlling the one or more control variables using the reinforcement learning control model trained for a second condition regarding a state after the current temperature of the target points converges to the target temperature; and
- acquiring a target indirect indicator corresponding to the acquired target temperature,
- wherein the reinforcement learning control model is trained based on a reward that is calculated differently for the first condition and the second condition respectively, and
- wherein the target indirect indicator includes a value obtained through at least one sensor from the environment, when the current temperature of the target points converges towards the target temperature, based on the reinforcement learning control model controlling one or more control variables, the reinforcement learning control model being trained to control one or more control variables based on a state information, and
- wherein a training method of the reinforcement learning control model for the second condition regarding state after the current temperature of the target points converges to the target temperature includes:
  - training a first control agent comprised in the reinforcement learning control model, based on a reward computed based on the current temperature of the target points, the target temperature, and total amount of work; and
- training a second control agent comprised in the reinforcement learning control model, based on a reward computed based on a current indirect indicator and the target indirect indicator.

12. A device for controlling an energy management system (EMS) comprising:
- one or more processors;
- a memory coupled to the one or more processors; and
- a network unit coupled to the one or more processors;
- wherein the one or more processors are configured to:
  - acquire a target temperature of one or more target points;
  - control one or more control variables using a reinforcement learning control model trained for a first condition regarding a state before a current temperature of the target points converges to the target temperature;
  - control the one or more control variables using the reinforcement learning control model trained for a second condition regarding a state after the current temperature of the target points converges to the target temperature; and
  - acquire a target indirect indicator corresponding to the acquired target temperature,
- wherein the reinforcement learning control model is trained based on a reward that is calculated differently for the first condition and the second condition respectively,
- wherein the target indirect indicator includes a value obtained through at least one sensor from the environment, when the current temperature of the target points converges towards the target temperature, based on the reinforcement learning control model controlling one or more control variables, reinforcement learning control model being trained to control one or more control variables based on a state information, and
- wherein a training method of the reinforcement learning control model for the second condition regarding state after the current temperature of the target points converges to the target temperature includes:
  - training a first control agent comprised in the reinforcement learning control model, based on a reward computed based on the current temperature of the target points, the target temperature, and total amount of work; and training a second control agent comprised in the reinforcement learning control model, based on a reward computed based on a current indirect indicator and the target indirect indicator.

* * * * *